(12) United States Patent
Schumacher et al.

(10) Patent No.: US 11,657,694 B2
(45) Date of Patent: May 23, 2023

(54) MOBILE DEVICE USAGE MONITORING FOR COMMERCIAL VEHICLE FLEET MANAGEMENT

(71) Applicant: Stoneridge Electronics, AB, Solna (SE)

(72) Inventors: Darren Schumacher, Ann Arbor, MI (US); Stuart Adams, Murthly (GB); Nathan Schuler, Fort Wayne, IN (US); Dominik Marx, Novi, MI (US); John Germaine, Northville, MI (US)

(73) Assignee: Stoneridge Electronics AB, Solna (SE)

( * ) Notice: Subject to any disclaimer, the term of this patent is extended or adjusted under 35 U.S.C. 154(b) by 0 days.

(21) Appl. No.: 17/145,891

(22) Filed: Jan. 11, 2021

(65) Prior Publication Data

US 2021/0174103 A1 Jun. 10, 2021

Related U.S. Application Data

(63) Continuation-in-part of application No. 16/845,228, filed on Apr. 10, 2020.

(Continued)

(51) Int. Cl.
*G08B 21/06* (2006.01)
*G06T 7/70* (2017.01)

(Continued)

(52) U.S. Cl.
CPC .............. *G08B 21/06* (2013.01); *G06F 18/22* (2023.01); *G06F 18/24* (2023.01); *G06T 7/70* (2017.01);

(Continued)

(58) Field of Classification Search
None
See application file for complete search history.

(56) References Cited

U.S. PATENT DOCUMENTS

| 6,681,195 B1 | 1/2004 | Poland et al. |
| 10,068,140 B2 | 9/2018 | Levkova et al. |

(Continued)

FOREIGN PATENT DOCUMENTS

| CN | 103395404 A | 11/2013 |
| JP | 2007299048 A | 11/2007 |

(Continued)

OTHER PUBLICATIONS

International Preliminary Report on Patentability for International Application No. PCT/US2020/027639 dated Oct. 21, 2021.

(Continued)

*Primary Examiner* — Delomia L Gilliard
(74) *Attorney, Agent, or Firm* — Carlson, Gaskey & Olds, P.C.

(57) ABSTRACT

A driver monitoring system includes at least two cameras configured to record images of a driver within a cabin of a vehicle. A first camera is disposed on a driver side of the cabin and a second camera is disposed on a passenger side of the cabin. At least one of the at least two cameras is disposed in a mirror replacement display or in a mirror replacement display location. A controller is in communication with the at least two cameras and is configured to determine a pose of the driver based on images from the at least two cameras. At least one of the images originates from at least one of the first camera and the second camera.

19 Claims, 7 Drawing Sheets

Related U.S. Application Data

(60) Provisional application No. 62/833,252, filed on Apr. 12, 2019.

(51) Int. Cl.
*G06V 20/59* (2022.01)
*G06V 40/10* (2022.01)
*G06F 18/22* (2023.01)
*G06F 18/24* (2023.01)
*G06V 10/764* (2022.01)
*G06V 10/82* (2022.01)
*G06V 40/19* (2022.01)

(52) U.S. Cl.
CPC ............ *G06V 10/764* (2022.01); *G06V 10/82* (2022.01); *G06V 20/597* (2022.01); *G06V 40/107* (2022.01); *G06V 40/19* (2022.01); *G06T 2207/20081* (2013.01); *G06T 2207/30244* (2013.01); *G06T 2207/30268* (2013.01)

(56) References Cited

U.S. PATENT DOCUMENTS

| | | | |
|---|---|---|---|
| 10,181,266 | B2 | 1/2019 | Gupta et al. |
| 10,196,071 | B1 | 2/2019 | Rowson et al. |
| 2013/0188838 | A1* | 7/2013 | Tsou ................ B60K 28/066 382/104 |
| 2013/0314536 | A1* | 11/2013 | Frank ................ B60R 21/0154 348/148 |
| 2017/0237946 | A1* | 8/2017 | Schofield ............ B60C 23/0408 348/148 |
| 2018/0015825 | A1* | 1/2018 | Nania ..................... B60Q 9/00 |
| 2018/0231976 | A1 | 8/2018 | Singh |
| 2019/0147263 | A1* | 5/2019 | Kuehnle ............... G07C 5/008 340/439 |
| 2021/0314497 | A1* | 10/2021 | Nemeth ............... G06V 10/751 |
| 2021/0394775 | A1* | 12/2021 | Julian ................ B60W 40/08 |

FOREIGN PATENT DOCUMENTS

| | | |
|---|---|---|
| JP | 2011034215 A | 2/2011 |
| KR | 20130095144 A | 8/2013 |

OTHER PUBLICATIONS

Seeing Machines, Guardian, "Driver Fatigue Monitoring System: Guardian by Seeing Machines—Guardian," downloaded from https://www.seeingmachines.com/guardian/guardian/ on Mar. 13, 2019.
Samsara, "AI Dash Cams." Downloaded from https://www.samsara.com/fleet/dash-cam on Apr. 10, 2020.
International Search Report and Written Opinion for International Application No. PCT/US2020/027639 dated Sep. 16, 2020.

* cited by examiner

MOBILE DEVICE USAGE MONITORING FOR COMMERCIAL VEHICLE FLEET MANAGEMENT

CROSS-REFERENCE TO RELATED APPLICATIONS

This disclosure is a continuation in part of U.S. patent application Ser. No. 16/845,228, which was filed on Apr. 10, 2020, and which claims priority to U.S. Provisional Application No. 62/833,252. U.S. Provisional Application No. 62/833,252 was filed on Apr. 12, 2019, and is incorporated herein by reference in its entirety.

BACKGROUND

This application relates to driver monitoring, and more particularly to recording images depicting a driver during anomalous driving events.

Safety costs in the commercial vehicle space have been rising dramatically, with distracted driving being a primary cause of accidents. Cellular phone usage is believed to be a major contributor to these types of distracted driver accidents.

SUMMARY

In one exemplary embodiment a driver monitoring system includes at least two cameras configured to record images of a driver within a cabin of a vehicle, a first camera disposed on a driver side of the cabin, a second camera disposed on a passenger side of the cabin, and wherein at least one of the at least two cameras is disposed in a mirror replacement display or in a mirror replacement display location, a controller in communication with the at least two cameras and the controller configured to determine a pose of the driver based on images from the at least two cameras, wherein at least one of the images originates from at least one of the first camera and the second camera.

In another example of the above described driver monitoring system the at least two cameras includes a third camera, and wherein the third camera faces a rear of the cabin and defines a field of view including a driver's face when the driver is looking forward.

In another example of any of the above described driver monitoring systems the first camera is incorporated in a driver side mirror replacement monitor and defines a field of view including at least the driver's face when the driver is looking toward a driver's side window and at least one driver's arm, one driver's hand, and one driver's shoulder.

In another example of any of the above described driver monitoring systems the second camera is incorporated in a passenger side mirror replacement monitor and defines a field of view including the driver's face when the driver is looking toward a passenger side window and at least the other of the driver's arm, driver's hand and driver's shoulder.

In another example of any of the above described driver monitoring systems the controller is operable to obtain the at least one particular image from a rolling video buffer recorded within a time window corresponding to the anomalous event, and wherein the rolling video buffer includes a video feed originating from the at least two cameras.

In another example of any of the above described driver monitoring systems the controller is further configured to determine a gaze of the driver based at least in part on analysis of at least two simultaneous images of the at least two cameras.

In another example of any of the above described driver monitoring systems the controller is configured to supplement the attentive/inattentive pose detection with the gaze detection.

In another example of any of the above described driver monitoring systems the controller is further configured to analyze a determined driver pose from the pose detector and thereby determine if the pose is an attentive pose or an inattentive pose.

In another example of any of the above described driver monitoring systems the analysis to determine if the pose is an attentive pose or an inattentive pose uses a machine learned algorithm.

In another example of any of the above described driver monitoring systems the at least two cameras include a third camera disposed approximately in front of the driver.

In one exemplary embodiment a driver monitoring system includes a gaze tracking system including a plurality of cameras the gaze tracking system being configured to record images of a driver within a cabin of a vehicle and determine a gaze direction of the driver using the recorded images, and a controller in communication with the gaze tracking camera and configured to detect a potential distracted driving event based on the gaze direction of the driver deviating from a predefined alert driver area for an amount of time exceeding a predefined time threshold.

Another example of the above described driver monitoring system further includes a pose tracking system configured to determine a pose of the driver based in part on a body part position relative to at least one of a vehicle component and another body part position.

In another example of any of the above described driver monitoring systems the body part includes at least one of a hand, an arm, a torso, and a face of the driver.

In another example of any of the above described driver monitoring systems the plurality of cameras includes at least two cameras and wherein at least one of the at least two cameras is disposed within a mirror replacement monitor.

In another example of any of the above described driver monitoring systems the controller is configured to provide at least one image to a convolutional neural network, the convolutional neural network having been trained to identify an inattentive drive pose with a first data set including images from a position of a first camera of the at least two cameras and a second data set including images from a position of a second camera of the at least two cameras.

In another example of any of the above described driver monitoring systems the neural network is configured to analyze the recorded images and identify an occurrence of the driver utilizing a mobile device within the recorded images, and the neural network is configured to cause the driver monitoring system to perform at least one of transmitting the recorded images to a fleet manager and store the recorded images in a local repository of anomalous driving images.

In another example of any of the above described driver monitoring systems the controller is configured to obtain additional images depicting the driver from the gaze tracking camera, or another camera, at random intervals, and transmit the additional images to a fleet manager, store the additional images in the local repository of anomalous driving images, or both.

An exemplary method of monitoring a driver includes recording images of a driver within a cabin of a vehicle using a driver monitoring system including at least two cameras including a first camera and a second camera, each of the first camera and the second camera being incorporated into a mirror replacement monitor, detecting an anomalous driving event of the vehicle based on input from at least one vehicle sensor, obtaining at least two particular images from the driver monitoring system depicting the driver during the anomalous event each of the at least two particular images being from a distinct camera in the at least two cameras, and performing at least one of transmitting the particular images to a fleet manager and storing the particular images in a local repository of anomalous driving images.

Another example of the above described exemplary method of monitoring a driver further includes determining a pose of the driver in the recorded images based at least in part on which of the at least the first camera and the second camera includes the driver's face, detecting a potential distracted driving event based on the pose of the driver, as depicted in a particular image of the recorded images, being consistent with an inattentive pose for an amount of time exceeding a predefined time threshold, and performing at least one of transmitting the particular image to a fleet manager and storing the particular image in a local repository of anomalous driving images in response to detecting the distracted driving event.

The embodiments, examples, and alternatives described in the claims and in the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
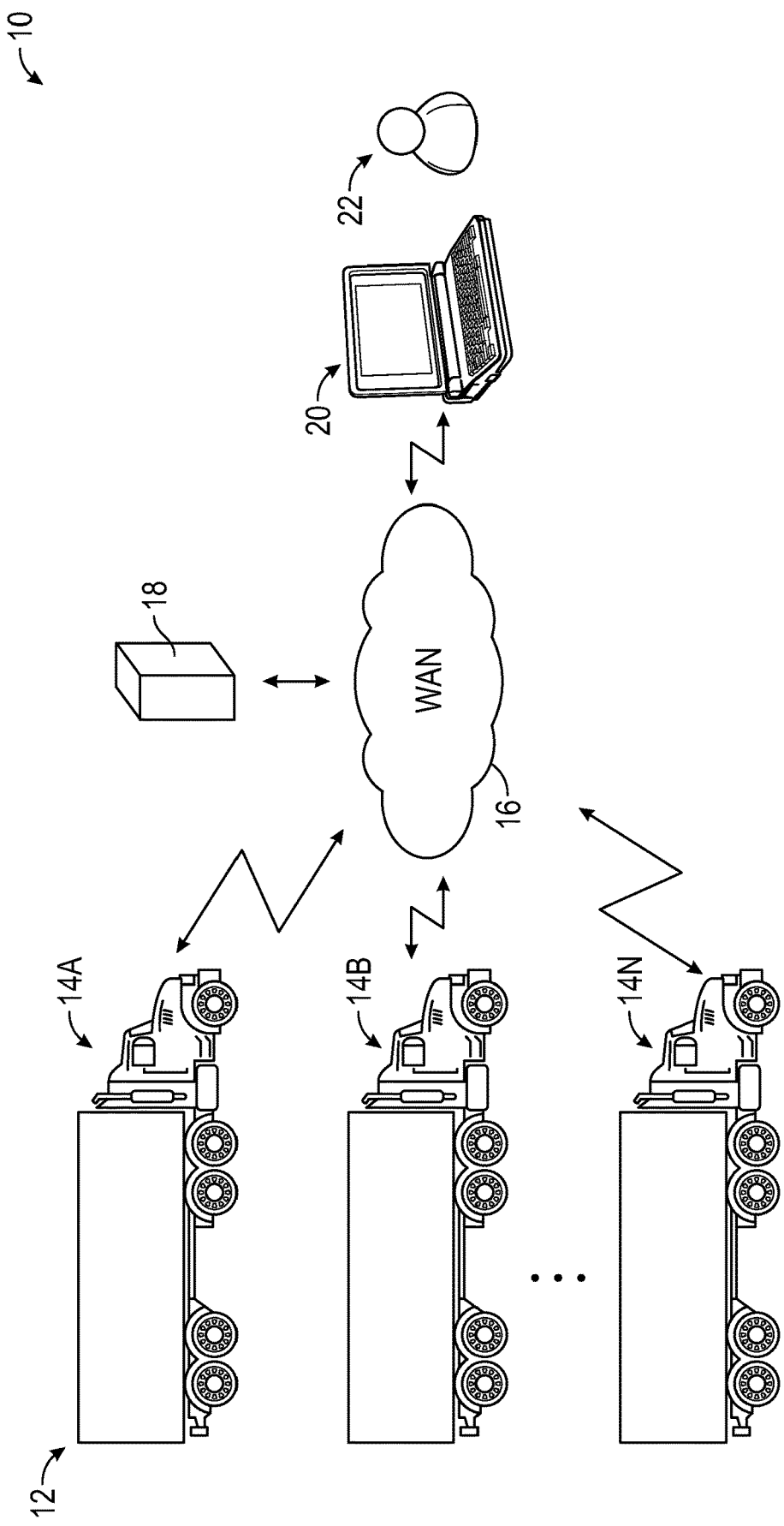
FIG. 1 schematically illustrates an example fleet management system.

FIG. 1 schematically illustrates an example fleet management system 10 that includes a fleet 12 of vehicles 14A-N operable to communicate with a fleet manager 22 through a wide area network ("WAN") 16, such as the Internet. The vehicles 14 are operable to record images depicting drivers of the vehicles 14, and to store or transmit those images, optionally along with associated event data describing how the vehicles 14 are being operated (e.g., acceleration events, steering events, braking events, near collisions, etc.).

In one example, the vehicles 14A-N transmit the images and/or event data to the fleet manager 22 by transmitting the images to a fleet management server 18, where they can be accessed by a computing device 20 of the fleet manager 22 that supervises the fleet 12. In one example, the vehicles 14A-N can transmit the images and/or event data to the fleet manager 22 by transmitting to the computing device 20 of the fleet manager 22, bypassing the fleet management server 18. In one example, in addition to or as an alternative to transmitting the images to the fleet manager 22, the vehicles 14 store the images in a local repository in the vehicles 14. In one example, whether a given image is transmitted via the WAN 16 or is stored in the local repository is based on whether the vehicle 14 currently has connectivity to the WAN 16. In the example of FIG. 1, the vehicles 14 are trucks, but it is understood that other commercial vehicles could be used, such as delivery vans and the like.

Figure 2:
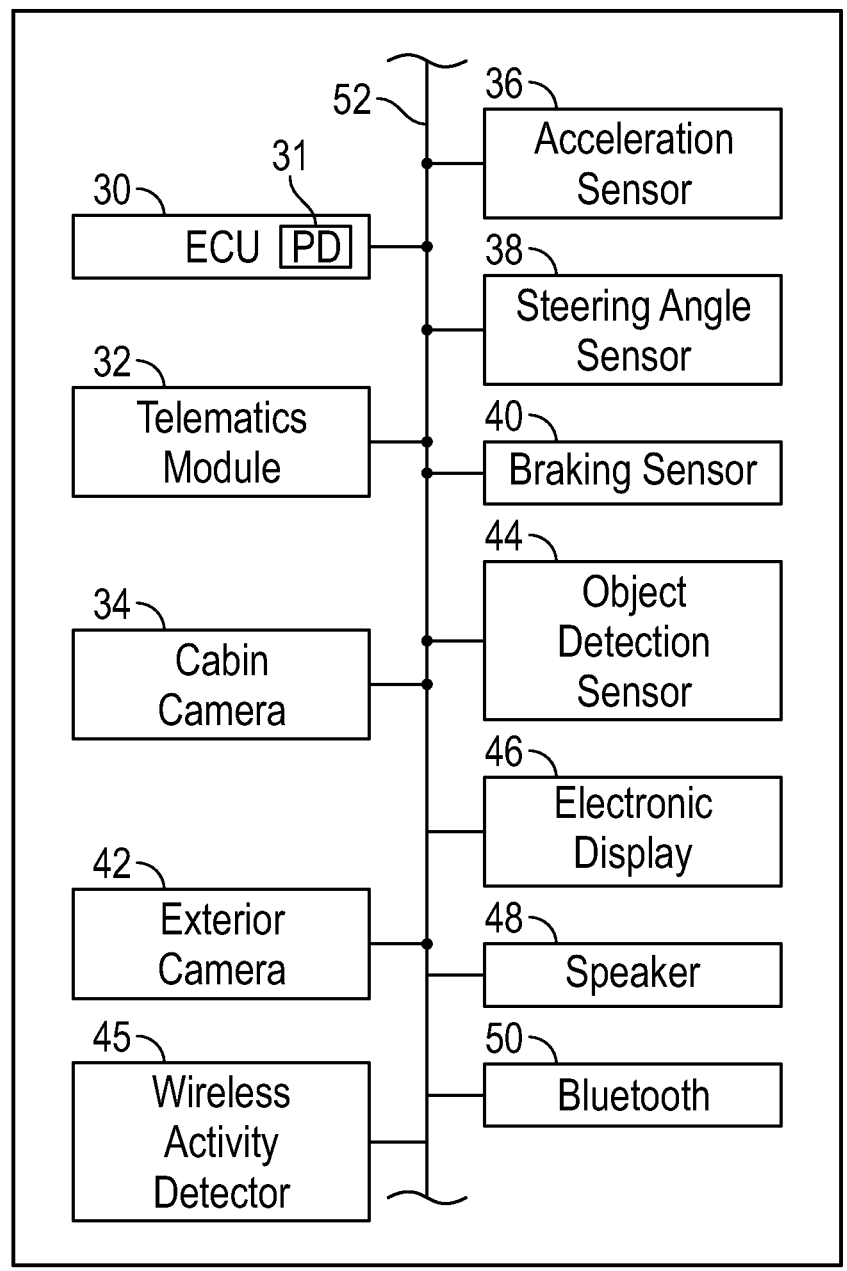
FIG. 2 schematically illustrates components of an example driver monitoring system for each vehicle in FIG. 1.

FIG. 2 schematically illustrates components of an example driver monitoring system 24 provided in each vehicle 14. In the example of FIG. 2, the driver monitoring system 24 includes an electronic control unit (ECU) 30 which is operably connected to a telematics module 32, a cabin camera 34, an acceleration sensor 36, a steering angle sensor 38, and a braking sensor 40. Although three sensors 34-38 are described, it is understood that fewer or more sensors could be used. For example, the ECU 30 may be operably connected to an exterior camera 42 operable to record images of a surrounding environment of the vehicle 14, an object detection sensor 44 operable to detect objects exterior to the vehicle 14, a wireless activity detector 45 operable to detect wireless device usage by a driver, an electronic display 46, a vehicle speaker 48, and/or a Bluetooth module 50.

In one example, the electronic display 46 and speaker 48 are part of a driver information system ("DIS") that provides information about a vehicle status (e.g., speed, engine RPMs, etc.). In this example, the electronic display 46 could be part of a vehicle instrument cluster. As another example, the electronic display 46 could be a center console display that is part of an infotainment system that provides a combination of vehicle information and entertainment information (e.g., current radio station, climate control, and the like). In one example, the ECU 30 is integrated into a DIS ECU (not shown) or the telematics module 32. In some examples a pose detector 31 is included within the ECU 30 of the driver monitoring system 24. The pose detector 31 analyzes images from multiple cameras, including the cabin camera 24, to determine a general pose of the driver and trigger one or more responses based on the determined pose. The images from multiple cameras can be analyzed individually and used to verify each other, or the images from the multiple cameras can be merged into a single image to provide a more complete set of information for the ECU 30 to analyze in determining the pose of the operator.

In the example of FIG. 2, the ECU 30 is operably connected to the components 31-50 through a vehicle data bus 52, which may be a controller area network ("CAN") bus. Of course, FIG. 2 is only an example, and it is understood that the ECU 30 could connect to certain ones of the components 32-50 through other connections besides the vehicle data bus 52.

Figure 3:
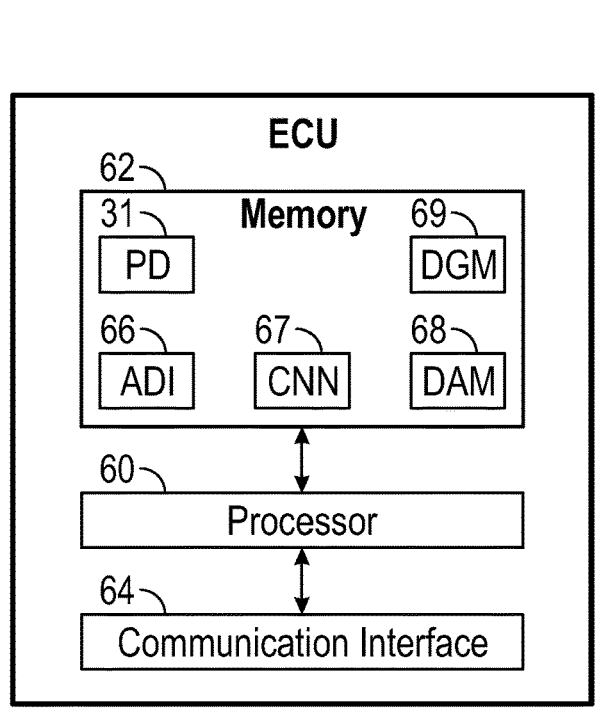
FIG. 3 schematically illustrates an electronic control unit of FIG. 2 in greater detail.

FIG. 3 schematically illustrates the ECU 30 in greater detail. Referring now to FIG. 3, the ECU 30 includes a processor 60 operatively connected to memory 62, and a communication interface 64. The processor 60 includes one or more processing circuits, such as microprocessors, microcontrollers, application specific integrated circuits (ASICs), or the like. The memory 62 may include one or several types of memory such as read-only memory (ROM), random-access memory, cache memory, flash memory devices, optical storage devices, etc. The memory 62 includes a local repository 66 of anomalous driving images, and optionally may also include a convolutional neural network ("CNN") 67, a driver attention model 68, and/or a driver gaze model 69. In some examples, the pose detector 31 is included within the memory 62 as well. The CNN 67 is, in some examples, operable to detect whether a driver is utilizing a mobile device in a cabin of the vehicle 14. As used herein, a "mobile device" refers to a handheld electronic device such as a cellular phone, smartphone, tablet, personal media player, or the like. Although depicted as being part of the ECU 30, it is understood that the CNN 67 could instead be stored external to the vehicle 14, such as in the fleet management server 18. The communication interface 64 provides for communication between the ECU 30 and other components (e.g., a wired connection to the vehicle data bus 52). In other examples, the CNN 67 is operable to detect an overall pose of the driver and trigger one or more responses within the ECU 30 based on whether the pose corresponds to attentive or inattentive driving. As used herein, attentive driving refers to a pose, gaze, or other operator condition that corresponds with the operator being aware of, and reacting appropriately to, existing conditions. Inattentive driving refers to poses, gazes, or other operator conditions that do not correspond with the operator being aware of or reacting appropriately to the existing conditions. By way of example, a driver eating, using a cell phone, or otherwise disengaged with the tasks associated with driving is considered to be inattentive.

Referring now to FIG. 2, with continued reference to FIG. 3, the cabin camera 34, which may be a gaze tracking camera, is configured to record images of a driver within a cabin of the vehicle 14, and each of the sensors 36-44 is configured to detect an anomalous driving event of the vehicle based on predefined criteria corresponding to distracted driving. In alternative examples, the video feed from cabin camera 34 may be provided to the pose detector 31. The pose detector 31 is configured to utilize the CNN 67 to track an operator's pose including arm position and orientation, hand position and orientation, torso twisting, relative orientations and/or positions of hands and face, arm and hand position relative to a steering apparatus, and any number of similar pose metrics that combine to define a pose the driver is currently in. The determined pose is then correlated with a number of trained poses and identified as being either attentive or inattentive. In yet further examples, the CNN 67 can combine the pose detection with the gaze detection of the cabin camera 34 to further improve the ability to distinguish between attentive and inattentive poses.

In some examples, detection of an anomalous driving event by one of the sensors 36-44 causes the ECU 30 to obtain a particular image taken by the cabin camera 34, or a pose identified by the pose detector 31, that depicts the driver during the anomalous event. The ECU 30 transmits the particular image or identified pose to the fleet manager 22 using the telematics module 32 and/or stores the particular image or identified pose in the local repository 66. The anomalous driving event can include sudden acceleration, sudden deceleration, a sudden steering trajectory change, an unexpectedly long duration of constant steering stability, deviation from an expected road position determined by satellite navigation, or any other similar occurrence. Inattentive driving can occur for any number of reasons including, but not limited to, cellular phone usage, eating, drowsiness, and operation of an entertainment system.

The acceleration sensor 36 is configured to detect an anomalous acceleration event, such as rapid acceleration or deceleration of the vehicle 14, which could be indicative of distracted driving. The predefined criteria for the acceleration sensor 36 could include a rate of acceleration above a predefined acceleration threshold or a rate of deceleration below a predefined deceleration threshold, for example.

The steering angle sensor 38 is configured to detect an anomalous steering event, such as a rapid steering wheel angle change that could be indicative of swerving. For example, the predefined criteria for the steering angle sensor 38 could include a change in steering angle beyond a predefined angle threshold within a predefined time period while the vehicle 14 is traveling at a speed above a predefined speed threshold, which could be indicative of swerving as a result of distracted driving.

The braking sensor 40 is configured to detect an anomalous braking event, such as rapid braking of the vehicle 14, and could be configured to measure changes in vehicle velocity, and/or control signals transmitted to a vehicle braking system, for example.

The object detection sensor 44 may be a LIDAR ("light detection and ranging") or RADAR ("radio detection and ranging") sensor, for example. The object detection sensor 44 can be used on its own, or in conjunction with the ECU 30, to detect near-collision incidents in which a collision was narrowly avoided.

The telematics module 32 includes a wireless transceiver operable to transmit images through the WAN 16. In one example, the telematics module 32 is configured to use a predefined protocol standard such as one or more of the 802.11 standards and/or one or more cellular standards (e.g., GSM, CDMA, LTE, etc.).

The wireless activity detector 45 includes an antenna configured to detect radio signals, and includes related processing circuitry for determining if a detected radio signal represents mobile device usage within a cabin of the vehicle 14 based on one or more predefined thresholds. The criteria used by the processing circuitry of wireless activity detector 45 could include any one or combination of the following: signal strength, signal duration, and mobile device identifier. Some example mobile device identifiers could include an international mobile subscriber identity ("IMSI"), an Internet protocol ("IP") address, a media access control ("MAC") address, and if a mobile device identifier associated with the driver is detected, it is more likely that the signal transmission corresponds to mobile device usage by the driver and not a pedestrian or driver of a nearby vehicle.

In one example, signal duration is used to distinguish between background activity, such as handovers between adjacent cells, where a driver is not actually using the mobile device, and active use of the mobile device (e.g., phone calls, video streaming, etc.) where the signal duration is more likely to exceed a predefined signal length threshold.

In one example, the wireless activity detector 45 is configured to limit its monitoring to frequency bands linked to known telecommunication standards, such as GSM band(s), CDMA band(s), LTE band(s), WiMax band(s), WiFi band(s), etc. In one example, the wireless activity detector 45 includes a plurality of antennas, each tuned for a particular one or set of frequency bands, and/or includes one or more antennas configured to sweep a plurality of such frequency bands.

In one example, the wireless activity detector 45 is configured to base its detection at least in part on signal strength, as a signal detected from a mobile device in the vehicle cabin is likely to be stronger than that of a mobile device in a neighboring vehicle.

In one example, the cabin camera 34 is a video camera operable to provide a rolling buffer of a predefined duration (e.g., 30 seconds) that overwrites itself if not backed up, and the ECU 30 is operable to obtain images from frames of the rolling video buffer within a time window corresponding to an anomalous driving event. This could also provide an opportunity to preserve video leading up to an anomalous driving event to see what occurred during and prior to the anomalous driving event.

In one example, the ECU 30 is configured to record additional images depicting the driver from the cabin camera 34 at random intervals which may occur outside of anomalous driving events, and transmit the additional images to the fleet manager 22, store the additional images in the local repository 66 of anomalous driving images, or both. This random sampling could provide an additional level of compliance for the driver.

In one example, the ECU 30 is configured to adjust the predefined criteria used for determining anomalous driving events based on at least one of traffic density, weather conditions, and object detection in the vicinity of the vehicle 14. For example, in adverse weather conditions (e.g., rain, snow, icy roads) and or high-traffic or high-pedestrian areas, the thresholds used for determining what constitutes anomalous driving may be lowered from default values to a more stringent standard, particularly when the vehicle 14 is a large commercial truck.

The determination of whether weather conditions are adverse could be based on a weather forecast received at the ECU 30, for example. The determination of whether the vehicle 14 is in a high-traffic or high-pedestrian area could be based on, e.g., a traffic report received at the ECU 30 and/or based on object detection from the object detection sensor 44 or exterior camera 42.

Also, the predefined criteria used to detect anomalous driving event could be selected based on an experience level of a driver. This could provide for more stringent standards for less-experienced drivers, and more tolerant standards for experienced drivers.

In one example the ECU 30 is configured to continuously identify the drivers pose using the pose detector 31 and trigger an inattentive driver response when a pose corresponding to inattentive driving is detected. By way of example, the response can include auditory, visual, haptic, or any other sensory warning provided to the driver. In alternative examples, the inattentive driver response can be a command to store images of the driver in the inattentive pose generated from cameras in the vehicle for review by a supervisor and/or for further analysis.

In one example, the physical implementations described herein facilitate the tracking and monitoring of a pose of the vehicle operator by the ECU 30. When the ECU 30 detects an anomalous driving event, the ECU 30 reviews the images from multiple video feeds to determine the pose of the driver. Alternatively, the pose is continuously monitored by the pose detector 31. Once the pose is determined the ECU 30 determines whether the driver was distracted based at least in part on the pose.

By way of example, when a sudden deceleration event occurs the ECU 30 can trigger a review and determine a pose of the operator. If the pose of the operator is a forward facing and a hand/arm orientation is consistent with two hands gripping the steering wheel, the ECU 30 can determine that the driver was not distracted and the sudden deceleration is the result of an outside occurrence (e.g. an animal attempting to cross the road). In contrast, when the pose of the operator includes one hand off the steering wheel or holding a cellular phone and a torso and/or head turned to face the identified hand the ECU 30 can determine that the driver was distracted based on the identified pose. Similarly, if the pose includes an object such as food in one or both hands, and the positioning of the object is near the mouth, the pose of the operator corresponds to eating, and is an inattentive pose. It is appreciated that the preceding examples are non-limiting example pose determinations, and a practical implementation can utilize any number of identified poses or relative positions within a pose to determine whether the driver is distracted in a single system.

In examples where continuous monitoring is performed pose detections, such as the above examples, are determined on a continuous or periodic basis without requiring a prerequisite anomalous driving event.

In alternative examples, the video feeds and other sensor information can be provided via a network connection to a remote controller/processor that makes the determination at a center of operations instead of onboard the vehicle, with the determinations being made in the same manner.

Figure 4:
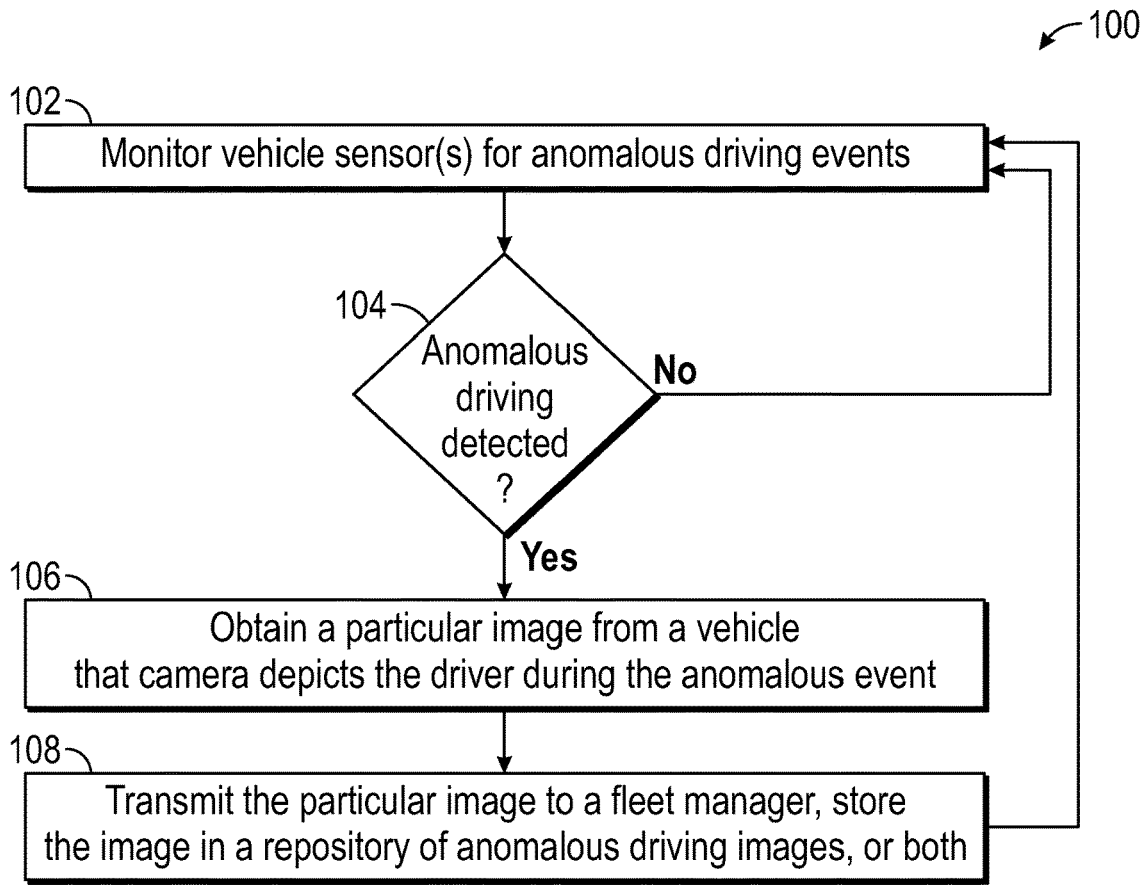
FIG. 4 is a flowchart of an example method of monitoring a driver.

FIG. 4 is a flowchart of one specific example method 100 of monitoring a driver. The ECU 30 monitors one or more vehicle sensors (e.g., sensors 36-44) for anomalous driving events (step 102). If no anomalous driving event is detected (a "no" to step 104), the ECU 30 keeps monitoring for anomalous driving events. If an anomalous driving event is detected (a "yes" to step 104), the ECU 30 obtains a particular image from the cabin camera 34 that depicts the driver during the anomalous event (step 106). The ECU 30 transmits the particular image to the fleet manager 22 and/or stores the image in the local repository 66 of anomalous driving images, and then resumes monitoring the vehicle sensors for anomalous driving events (step 102).

In some embodiments, the cabin camera 34 is a gaze tracking camera configured to record images of a driver within a cabin of the vehicle 14 and determine a gaze direction of the driver in the recorded images. Such cameras are commercially available from SmartEye (https://smart-eye.se/) and EyeSight (http://www.eyesight-tech.com/). In one example, the cabin camera 34 detects gaze by directing infrared or near-infrared light to a user's eye, and then measuring the reflection of that infrared light back from the driver's eye. Based on the angle of reflection, a gaze direction can be ascertained. In another example, the cabin camera 34 infers the gaze direction of the driver by determining a gaze vector from the general shape of the driver's head and/or the symmetry of the driver's face in a recorded image. Both of these techniques are well known to those of ordinary skill in the art, and therefore are not discussed in detail herein. In one example, the cabin camera 34 is integrated into a driver information system and/or instrument cluster.

In other examples, the cabin camera 34 can provide images to the pose detector 31, which is configured to determine a pose of the driver including what direction the driver is facing, arm/hand positions relative to the direction the driver was facing, arm/hand positions relative to the steering wheel, and any similar orientations or positions. The pose tracking can either be rule based with static rules established during configuration (e.g., when no hands are detected on the steering wheel the driver is inattentive) or machine learning based using a machine learning algorithm, such as a convolutional neural network (CNN) to learn distracted poses and non-distracted poses from a training set. In some examples, the pose detection uses images from at least two distinct cameras in order to provide a complete view of the vehicle operator. By way of example, simultaneous images from a driver side A-frame mounted camera and a passenger side A-frame mounted camera can be used to provide a complete view of the driver including features that may be obscured from one single camera and determine the pose based on features of both images. This example can fuse the two images into a single image, or analyze each separately and combine the analysis, depending on the configuration of the ECU 30.

Figure 5:
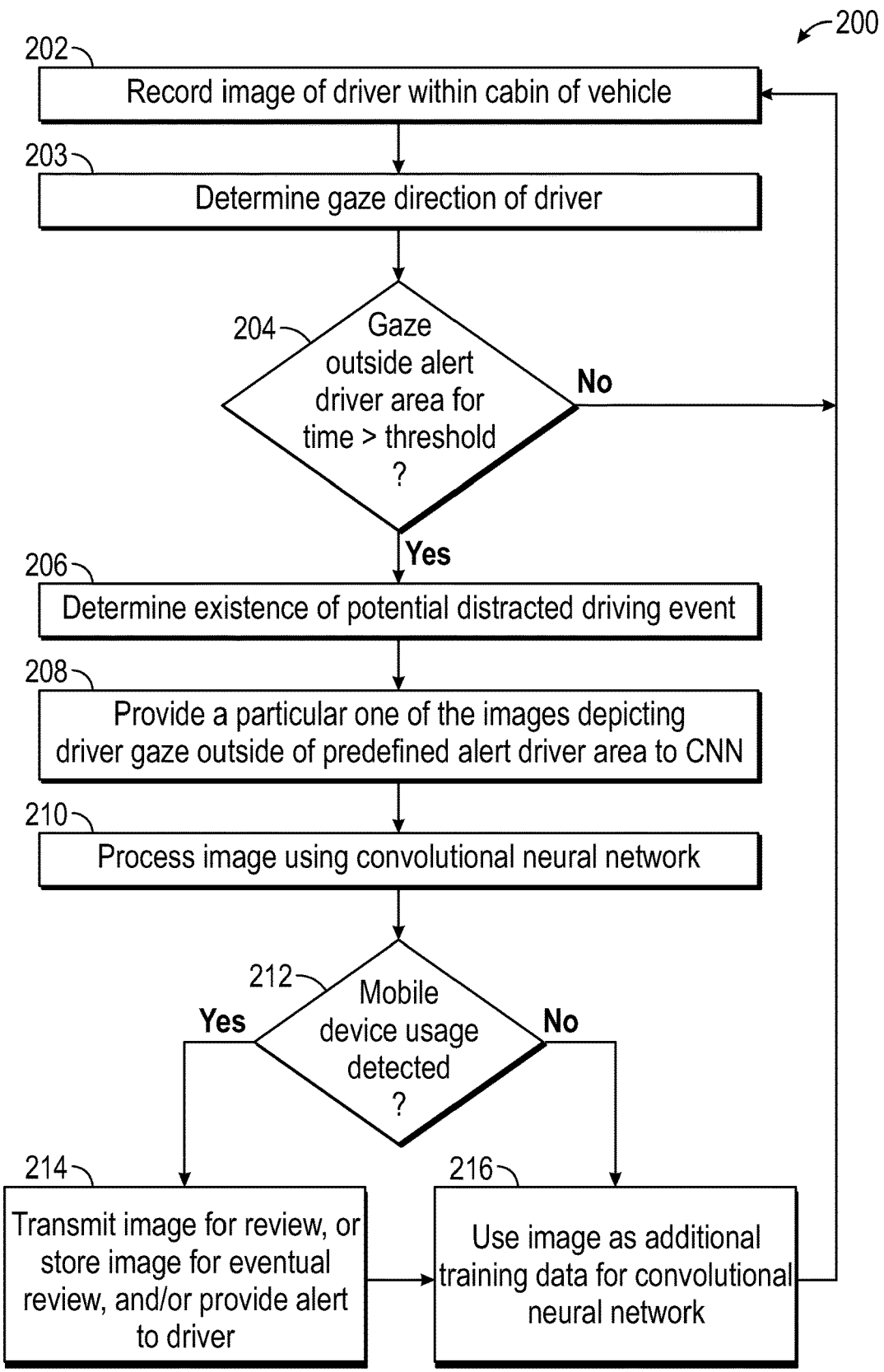
FIG. 5 is a flowchart of another example method of monitoring a driver.

FIG. 5 is a flowchart of an example method 200 of monitoring a driver in which the cabin camera 34 is a gaze tracking camera, and the ECU 30 utilizes a CNN 67. The cabin camera 34 records images of a driver within a cabin of the vehicle 14 (step 202), and determines a gaze direction of the driver in the recorded images (step 203). The ECU 30 determines whether the gaze is outside of a predefined alert driver area for an amount of time that exceeds a predefined time threshold (step 204).

Figure 6:
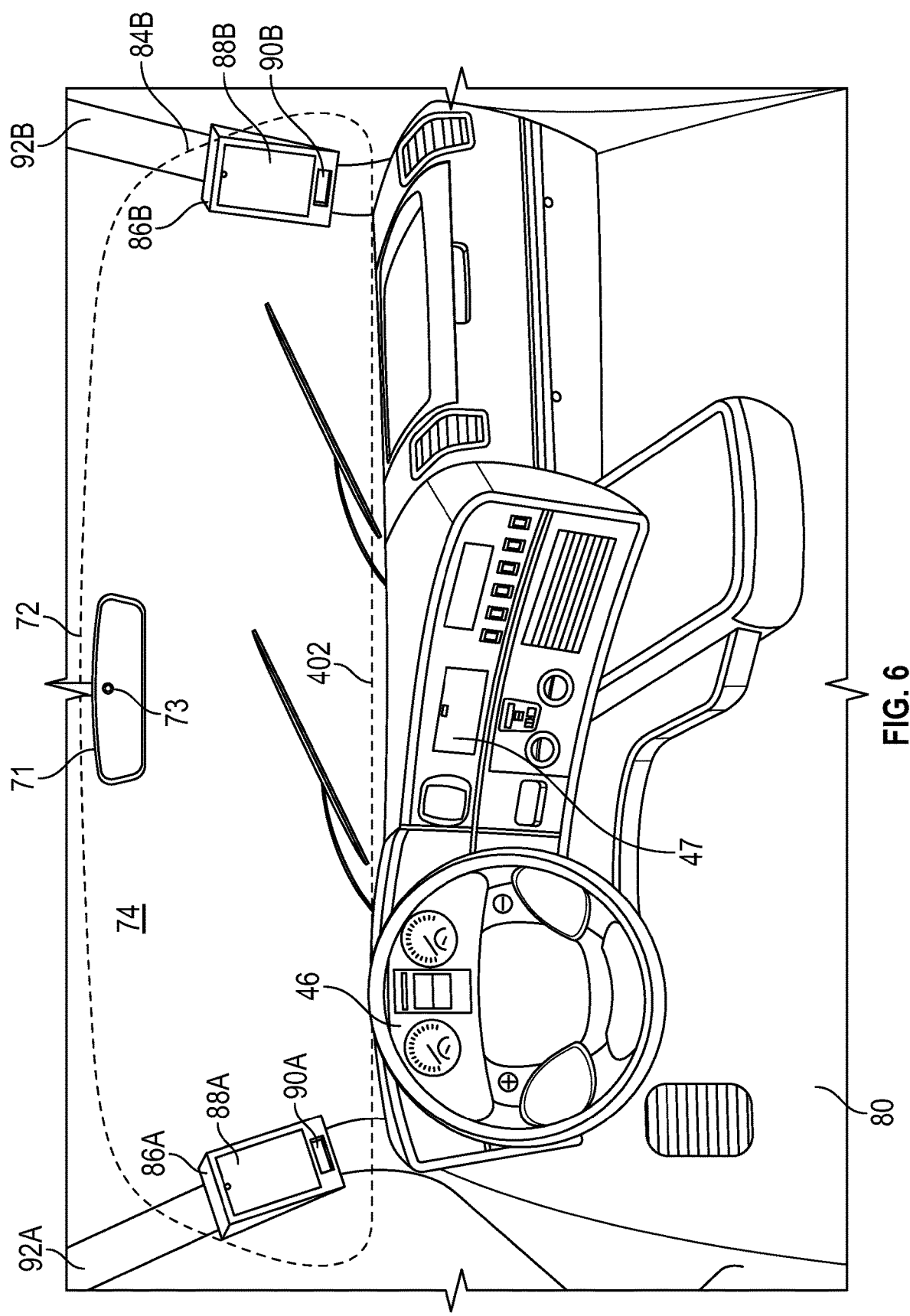
FIG. 6 schematically illustrates an example vehicle cabin.

Referring now to FIG. 6, an example vehicle cabin 70 is schematically shown, along with an example predefined alert driver area 72, which includes a windshield 74 and instrument cluster display 46, but excludes center console display 46B, and other areas that are likely to be indicative of distracted driving and/or mobile device usage, such as the driver's lap area 80, the majority of the driver and passenger windows 84A-B, etc.

In the example of FIG. 6, camera monitor system units 86A-B, which are mounted to A-frame pillars 92A-B, are provided within the alert driver area 72. Each camera monitor system unit 86A-B includes a respective electronic display 88A-B for providing an external vehicle video feed, and may optionally also include a respective camera 90A-B (which optionally may be used as the cabin camera 34 of FIG. 2 if desired). In one example, the camera monitor system units 86A-B are part of the MIRROREYE system from Stoneridge, Inc.

Figure 8:
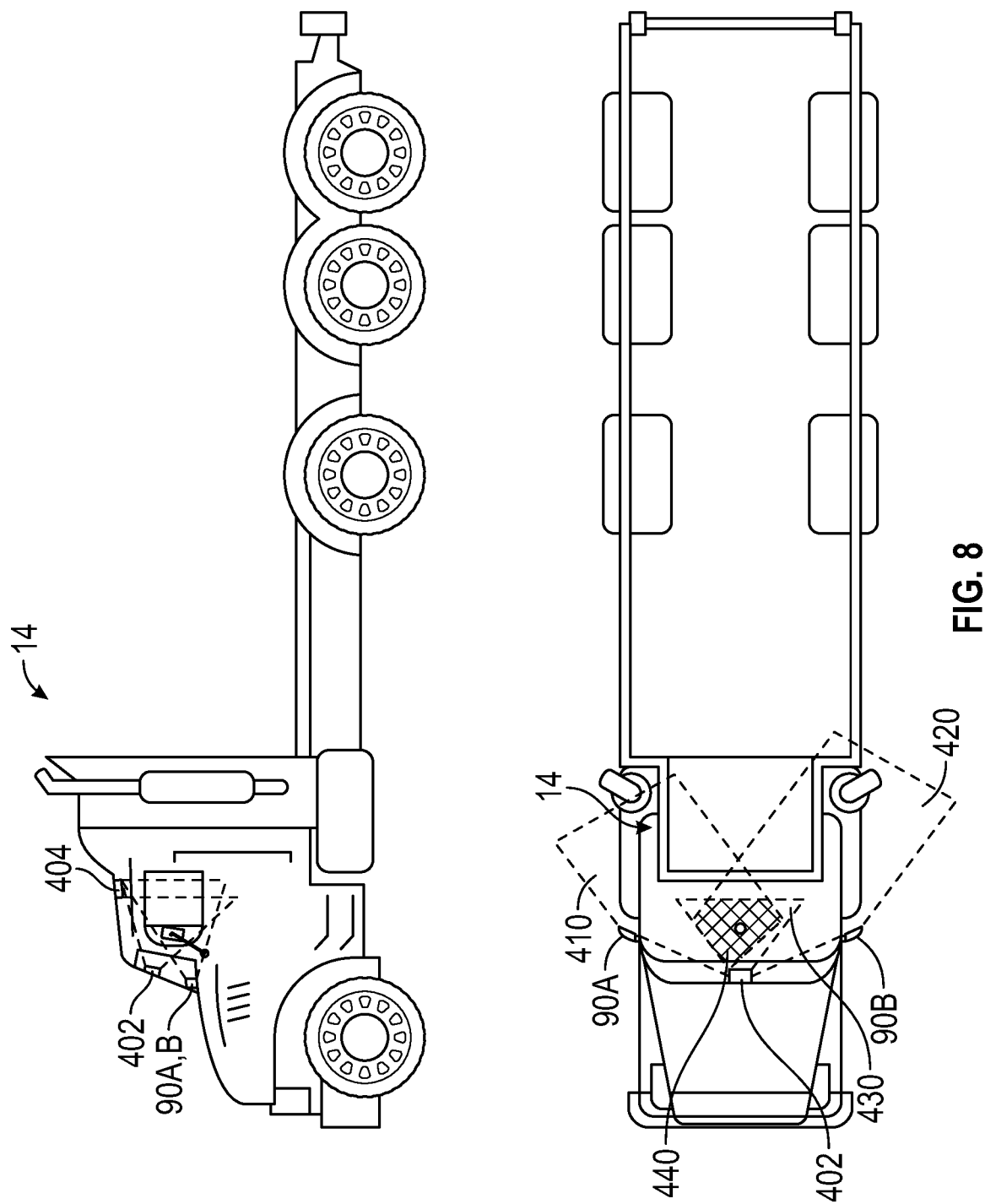
FIG. 8 schematically illustrates an exemplary vehicle including a mirror replacement system adapted to facilitate driver monitoring.

With continued reference to FIG. 6, FIG. 8 schematically illustrates a top view and a side view of a vehicle 14 including an embodiment of FIG. 6 where the cameras 90A, 90B, as well as at least one other camera 402, 73 are utilized by the ECU 30 to detect a driver's pose using the pose detector 31. Each camera defines a corresponding field of view 410, 420, 430 within the cabin 70, and the corresponding fields of view overlap at an overlap region 440. In one case, the at least one other camera 73 is positioned approximately in front of the driver, near a positioning of a conventional rear-view mirror. In the examples of FIGS. 6 and 8, the camera 73 is positioned in a [class VIII] view display 71. As used herein, approximately in front of the driver refers to a camera that includes the driver in its field of view while the camera is rear facing. In alternative embodiments the at least one other camera 402, 73 can include multiple cameras approximately in front of the driver. A driver head position 442 is within the overlap region 440 while the driver is seated in the cab 70. In some examples, one or more of the cameras 90A, 90B, 402 include gaze tracking systems, such as those described above with regards to cabin camera 34 (FIG. 2) and the gaze tracking systems can be utilized by the ECU to supplement or enhance the posed detection.

In the example of FIG. 6, each of the cameras 90A, 90B, 402 are included within a corresponding mirror replacement display for a camera mirror system, including displays configured to display at least field of visions classes II, IV, V, VI and VIII. Due to their usage as mirror replacement displays, each display includes clean distinct line of sight with the driver, including the driver's face as well as other portions of the driver (e.g. hands, arms, shoulders, head and torso) that can be used to determine the driver's overall pose, while the driver is seated in the cab 70. In addition, due to their function, well trained drivers will consistently face directly at one or more of the monitors including the cameras 90A, 90B, 402 just as they would for traditional mirrors and will maintain hands in contact with the steering/control systems regardless of what direction they are facing. In alternative examples, such as those where a camera replacement system is not used, the cameras 73, 90A, 90B, 402 can be positioned on the vehicle frame where the mirror replacement displays would be included in a vehicle using a mirror replacement system, as the direct lines of sight to the vehicle operator are present even when a physical display may be omitted from that positioning on the vehicle. In the illustrated example, the positions include The expected facing and hand/arm positioning assists a neural network, such as the CNN 67, in determining whether the driver is attentive or distracted based on the driver's pose, as well as whether the driver's attention is toward or away from a zone in which an alert is occurring at the time of the alert. The usage of the cameras and the CNN 67 to detect distraction is referred to as a distracted driver system.

In examples where the gaze tracking is used to supplement or enhance the determined pose analysis, the gaze tracking can identify the direction the driver is looking when the pose may indicate otherwise. By way of example, a pose including a hand in front of a mouth could be indicative of either a sneeze or a yawn. By combining the pose determination with the gaze tracking the system can determine if the driver's eyes are drooping (indicative of a yawn due to fatigue) or if the driver's eyes rapidly shut and reopen (indicative of a sneeze).

In some examples the distracted driving system can be integrated into existing mirror replacement systems, as the mirror replacement monitors can be relatively easily retrofit to incorporate the cameras 90A, 90B, 402. In addition, each of the mirror replacement monitors is connected to a vehicle ECU 30 and the incorporated cameras 73, 90A, 90B, 402 can piggyback on that connection to communicate with the ECU 30 without requiring a dedicated connection. In alternative examples, the cameras 90A, 90B, 402, 73 can be independent of a mirror replacement system and disposed freely about the cabin.

This, combined with the location benefits associated with the usage of the mirror replacement system identified previously means that existing mirror replacement systems are highly suitable for retrofitting.

In addition to the cameras 90A, 90B, 402 being incorporated into the mirror replacement monitors, one or more additional cameras 404 can be included within the cabin 70 and provide additional fields of view of the driver or other vehicle operator. The additional cameras 404 can be focused on regions of the vehicle where distractions may be more likely to occur, such as a center console where a driver may keep a mobile device (e.g. center console display 47). Alternatively, the additional cameras 404 can be focused on portions of the driver's body that are utilized to determine the overall pose of the driver in addition to the driver's face (e.g. a driver's arm or torso). In yet further alternatives the additional cameras can include cameras focused on regions of the vehicle where distractions may be present and cameras focused on portions of the driver's body able to assist in determining the overall pose. The additional cameras 404 can have timestamped image feeds which can be correlated with the image feeds from the cameras 90A, 90B, 402 within the mirror replacement monitors, and the multiple simultaneous images can provide additional resolution on attentive driver or inattentive driver determinations by a CNN 67 operating on the ECU 30 or operating remotely. In examples where the distracted driving detection system is local to the vehicle, the ECU can be configured to accept high-speed data input and can include hardware-accelerated machine learning that enhances the interpretation of the video by the CNN 67.

Referring again to FIG. 5, with continued reference to FIG. 6, if the driver's gaze is within the alert driver area 72, or is only outside of the alert driver area 72 for an amount of time less than the predefined time threshold (a "no" to step 204), then the ECU 30 resumes monitoring the gaze direction and/or pose of the driver.

Conversely, if the ECU 30 determines in step 204 that the driver's gaze is outside of the alert driver area 72 for an amount of time greater than the predefined time threshold (a "yes" to step 204), or the pose of the driver does not match an expected pose for attentive driving, then the ECU 30 determines that the gaze or pose corresponds to a potential distracted driving event (step 206), and provides a particular image of the driver when the driver's gaze direction is outside of the alert driver area 72, or the pose that does not match the expected poses for attentive driving, to the CNN 67 (step 208).

The CNN 67 is trained with images depicting drivers utilizing mobile devices, and the ECU 30 utilizes the CNN 67 to process the image and determine if the driver is utilizing a mobile device in the particular image (step 210). The training image set could include images of drivers texting, talking on the phone while holding the phone up to their face, having a hand near their face in a position suggesting phone usage (even if a phone is not visible), etc. Use of the CNN 67 helps to reduce false positive detections of distracted driver events. The training allows the CNN 67 to identify poses and relative positioning of vehicle components and body parts that are associated with distracted driving (e.g. A hand off the wheel and positioned in the center console, a gaze directed toward the center console and a hand off the wheel, a foreign object held next to the operator's mouth or any similar poses).

If mobile device usage is detected (a "yes" to step 212), the ECU 30 performs one or more predefined actions based on the potential distracted driving event, such as transmitting the image to the fleet manager 22 for review, storing the image for eventual review in the local repository 66 of anomalous driving, and/or providing an alert to the driver (step 214). The alert could be provided as an audio notification through vehicle speaker 48, as an audio notification to a wireless headset worn by the driver (e.g., using Bluetooth module 50), and/or a visual notification on the electronic display 46 within the cabin 70, for example. The particular image can then be used as additional training data for the CNN 67 (step 216) as part of a supervised machine learning process.

Alternatively, if a mobile device is not detected (a "no" to step 212), one or more (e.g., all) of the predefined actions are omitted, and the ECU 30 proceeds to step 216.

In a similar fashion to how the ECU 30 can adjust the anomalous driving detection thresholds, the ECU 30 can also adjust the thresholds use for determining when a driver's gaze is indicative of distracted driving and/or mobile device usage. For example, in certain environments, such as adverse weather conditions (e.g., rain, snow, icy roads) and or high-traffic or high-pedestrian areas, the alert driver area 72 could be narrowed from a default area and/or the time threshold used in step 204 could be shortened from a default value to enforce a more stringent level of driver attention. Conversely, in low-traffic and/or favorable weather conditions (i.e., non-icy, non-snowy, non-slippery) the alert driver area 72 could be expanded and/or the time threshold of step 204 could be lengthened.

In one example, the ECU 30 is configured to select one or both of the predefined time threshold of step 204 and the alert driver area 72 based on an experience level of the driver. This could provide for more stringent standards for less-experienced drivers, and more tolerant standards for experienced drivers Similarly, the threshold for when an alert is provided to a driver in step 214 could be selected based on driver experience level, with the understanding that such warnings may be more appropriate and/or useful for drivers with less experience than they would be for drivers with more experience.

As discussed above, the ECU may include a driver attention model 68 a driver gaze model 69 and/or a pose detector 31. Use of such models could provide an additional layer of refinement for the driver monitoring system 24, for example, by correlating pose with external objects and determining if drivers are fixating on certain objects when they should be gazing at other relevant objects in the area surrounding the vehicle. For example, the rapid movement of gaze direction from side to side could indicate a distracted driving event, even though the driver's gaze is focused externally to the vehicle (as their attention is not fixated on any situation long enough to indicate driver attention). Furthermore, the attention model indicating extended focus on a point near the driver's knee could indicate that the driver is utilizing the phone to access the internet while driving.

Figure 7:
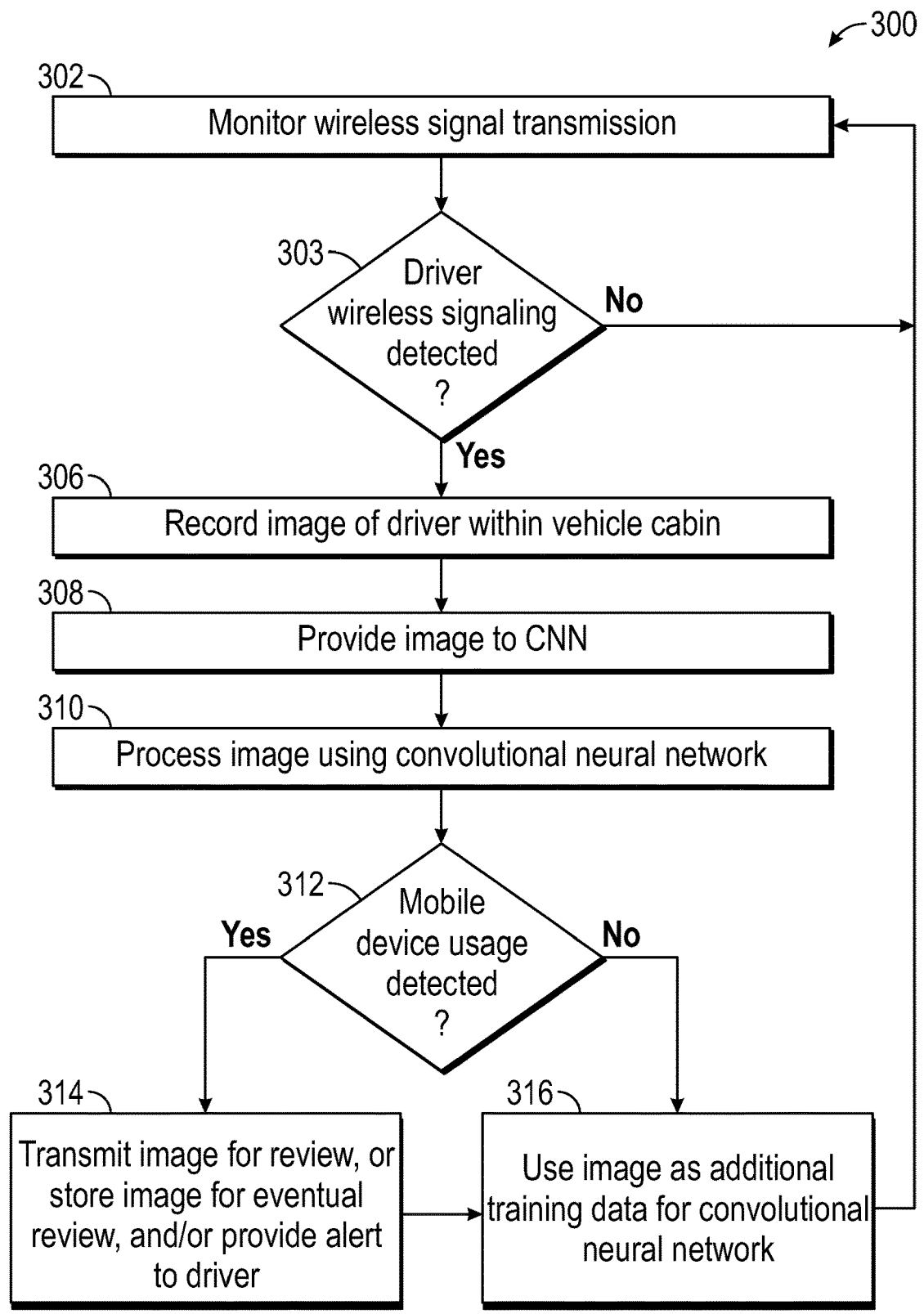
FIG. 7 is a flowchart of another example method of monitoring a driver.

FIG. 7 is a flowchart of another example method 300 of monitoring a driver in which the wireless activity detector 45 is used to monitor wireless signal transmissions based on any of the predefined criteria discussed above (e.g., signal strength, signal duration, and mobile device identifier) (step 302). If wireless signaling from a driver mobile device is detected (a "yes" to step 303), an image is recorded of the driver within the vehicle cabin 70, and the image is provided to the CNN 67 (step 308). Steps 310-316 are performed in the same manner as steps 210-216 as described above.

In one example, the CNN 67 is omitted, the ECU 30 just transmits the recorded image in step 306 for review, or stores the image for eventual review.

In one example, if the driver's mobile device is paired with the vehicle infotainment system or a headset (e.g., through Bluetooth), steps 306-316 are skipped. In one example, the wireless activity detector 45 detects whether the mobile device is paired with a headset and/or the infotainment system by monitoring for transmissions on a Bluetooth frequency band.

In one example, steps 302-303 are used in the method 200 as an additional layer of detection prior to utilizing the CNN 67 (e.g., between steps 206 and 208, such that the particular image is only provided to the CNN 67 if the wireless activity detector 45 corroborates the potential distracted driving event by detecting evidence of wireless signaling from a driver mobile device.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A driver monitoring system, comprising:
a camera mirror system comprising a plurality of cameras configured to record rear facing exterior views, a first display screen assembly positioned on a driver's side of a vehicle and configured to display a first rear facing view generated by at least one of the plurality of cameras, a second display screen assembly positioned on a passenger side of the vehicle and configured to display a second rear facing view generated by at least one of the plurality of cameras;
at least two cameras configured to record images of a driver within a cabin of a vehicle, a first camera of the at least two cameras disposed on a driver side of the cabin within the first display screen assembly, a second camera of the at least two cameras disposed on a passenger side of the cabin within the second display screen assembly;
a controller in communication with the at least two cameras and the controller configured to determine a pose of the driver based on images from the at least two cameras, wherein at least one of the images originates from at least one of the first camera and the second camera.

2. The driver monitoring system of claim 1, wherein the at least two cameras includes a third camera, and wherein the third camera faces a rear of the cabin and defines a field of view including a drivers face when the driver is looking forward.

3. The driver monitoring system of claim 1, wherein the first camera defines a field of view including at least the driver's face when the driver is looking toward a driver's side window and at least one driver's arm, one driver's hand, and one driver's shoulder.

4. The driver monitoring system of claim 3, wherein the second camera defines a field of view including the driver's face when the driver is looking toward a passenger side window and at least the other of the driver's arm, driver's hand and driver's shoulder.

5. The driver monitoring system of claim 1, wherein the controller is operable to obtain the at least one particular image from a rolling video buffer recorded within a time window corresponding to an anomalous event, and wherein the rolling video buffer includes a video feed originating from the at least two cameras.

6. The driver monitoring system of claim 1, wherein the controller is further configured to determine a gaze of the driver based at least in part on analysis of at least two simultaneous images of the at least two cameras.

7. The driver monitoring system of claim 6, wherein the controller is configured to supplement the attentive/inattentive pose detection with the gaze detection.

8. The driver monitoring system of claim 7, wherein the analysis to determine if the pose is an attentive pose or an inattentive pose uses a machine learned algorithm.

9. The driver monitoring system of claim 1, wherein the controller is further configured to analyze a determined driver pose from the pose detector and thereby determine if the pose is an attentive pose or an inattentive pose.

10. The driver monitoring system of claim 1, wherein the at least two cameras include a third camera disposed approximately in front of the driver.

11. The driver monitoring system of claim 1, wherein the first rear facing view is a driver's side rear view mirror replacement view and where the second rear facing view is a passenger side rear view mirror replacement view.

12. A driver monitoring system, comprising:
a gaze tracking system including a plurality of cameras, the gaze tracking system being configured to record images of a driver within a cabin of a vehicle and determine a gaze direction of the driver using the recorded images using a first camera and a second camera, the first camera being disposed within a first display screen assembly positioned on a driver side of the cabin and configured to display a first rear view mirror replacement view and the second camera being disposed with a second display screen assembly positioned on a passenger side of the cabin and configured to display a second rear view mirror replacement view and
a controller in communication with the gaze tracking camera and configured to:
detect a potential distracted driving event based on the gaze direction of the driver deviating from a predefined alert driver area for an amount of time exceeding a predefined time threshold.

13. The driver monitoring system of claim 12, further comprising a pose tracking system configured to determine a pose of the driver based in part on a body part position relative to at least one of a vehicle component and another body part position.

14. The driver monitoring system of claim 13, wherein the body part includes at least one of an arm, and a torso of the driver.

15. The driver monitoring system of claim 12, wherein the controller is configured to provide at least one image to a convolutional neural network, the convolutional neural network having been trained to identify an inattentive drive pose with a first data set including images from a position of a first camera of the at least two cameras and a second data set including images from a position of a second camera of the at least two cameras.

16. The driver monitoring system of claim 12, wherein the neural network is configured to analyze the recorded images and identify an occurrence of the driver utilizing a mobile device within the recorded images, and the neural network is configured to cause the driver monitoring system to perform at least one of transmitting the recorded images to a fleet manager and store the recorded images in a local repository of anomalous driving images.

17. The driver monitoring system of claim 12, wherein the controller is configured to:
obtain additional images depicting the driver from the gaze tracking camera, or another camera, at random intervals; and
transmit the additional images to a fleet manager, store the additional images in the local repository of anomalous driving images, or both.

18. A method of monitoring a driver, comprising:
recording images of a driver within a cabin of a vehicle using a driver monitoring system including a first camera and a second camera, each of the first camera and the second camera being incorporated into a corresponding display screen assembly, each of the display screen assemblies being configured to display a rear view mirror replacement view, a first of the corresponding display screen assemblies containing the first camera and being disposed on a driver side of the cabin and a second of the corresponding display screen assemblies containing the second camera and being disposed on a passenger side of the cabin;
detecting an anomalous driving event of the vehicle based on input from at least one vehicle sensor;

obtaining at least two particular images from the driver monitoring system depicting the driver during the anomalous event each of the at least two particular images being from a distinct camera in the at least two cameras; and performing at least one of transmitting the particular images to a fleet manager and storing the particular images in a local repository of anomalous driving images.

19. The method of claim 18, further comprising:

determining a pose of the driver in the recorded images based at least in part on which of the at least the first camera and the second camera includes the driver's face;

detecting a potential distracted driving event based on the pose of the driver, as depicted in a particular image of the recorded images, being consistent with an inattentive pose for an amount of time exceeding a predefined time threshold; and performing at least one of transmitting the particular image to a fleet manager and storing the particular image in a local repository of anomalous driving images in response to detecting the distracted driving event.

* * * * *